Feb. 17, 1959 G. E. SUDEROW 2,873,580
RELEASABLE GRIPPER AND LOCKING ASSEMBLY
FOR LAND AND MARINE SUPPORTING COLUMNS
Filed Sept. 29, 1953 7 Sheets-Sheet 4
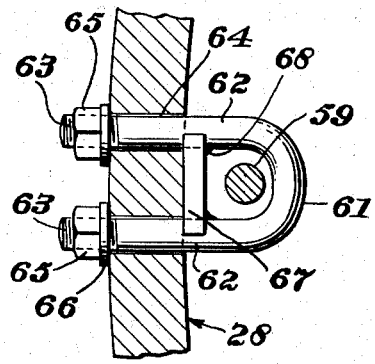
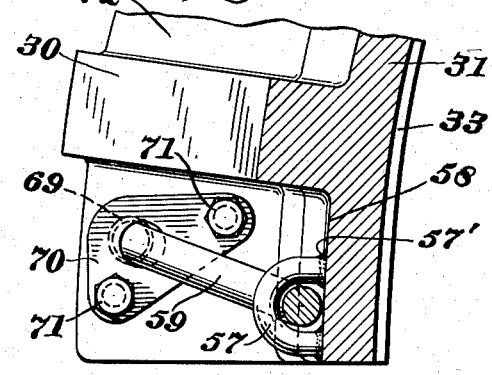
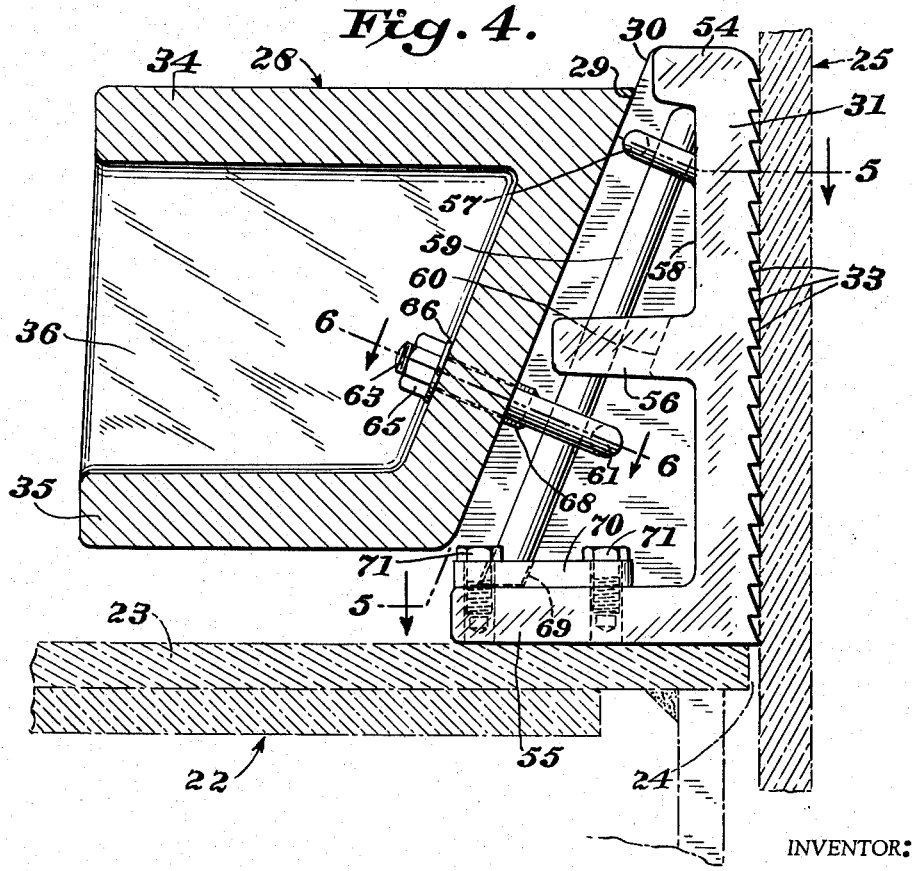
INVENTOR:
George E. Suderow,
BY
ATTORNEYS.

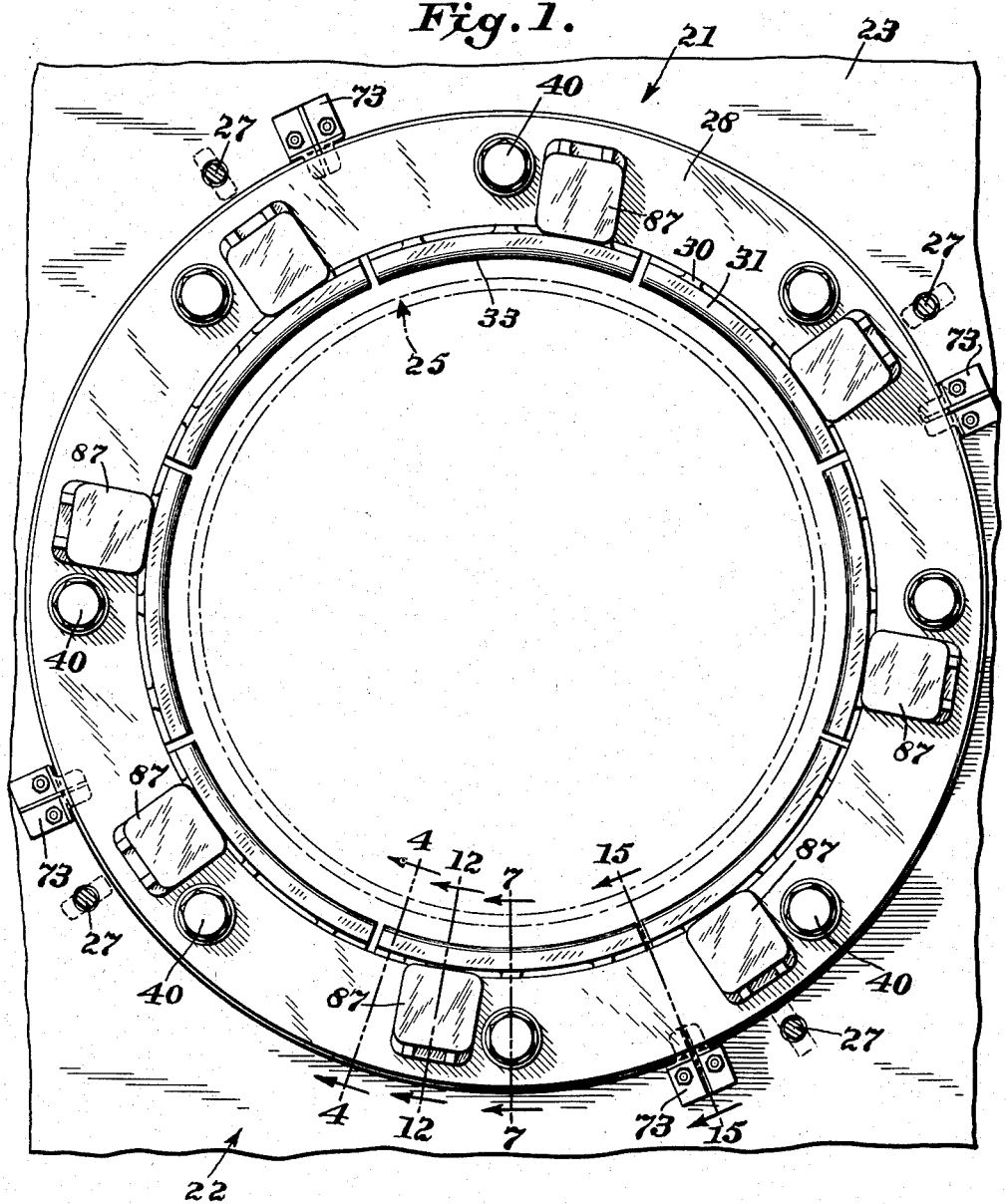

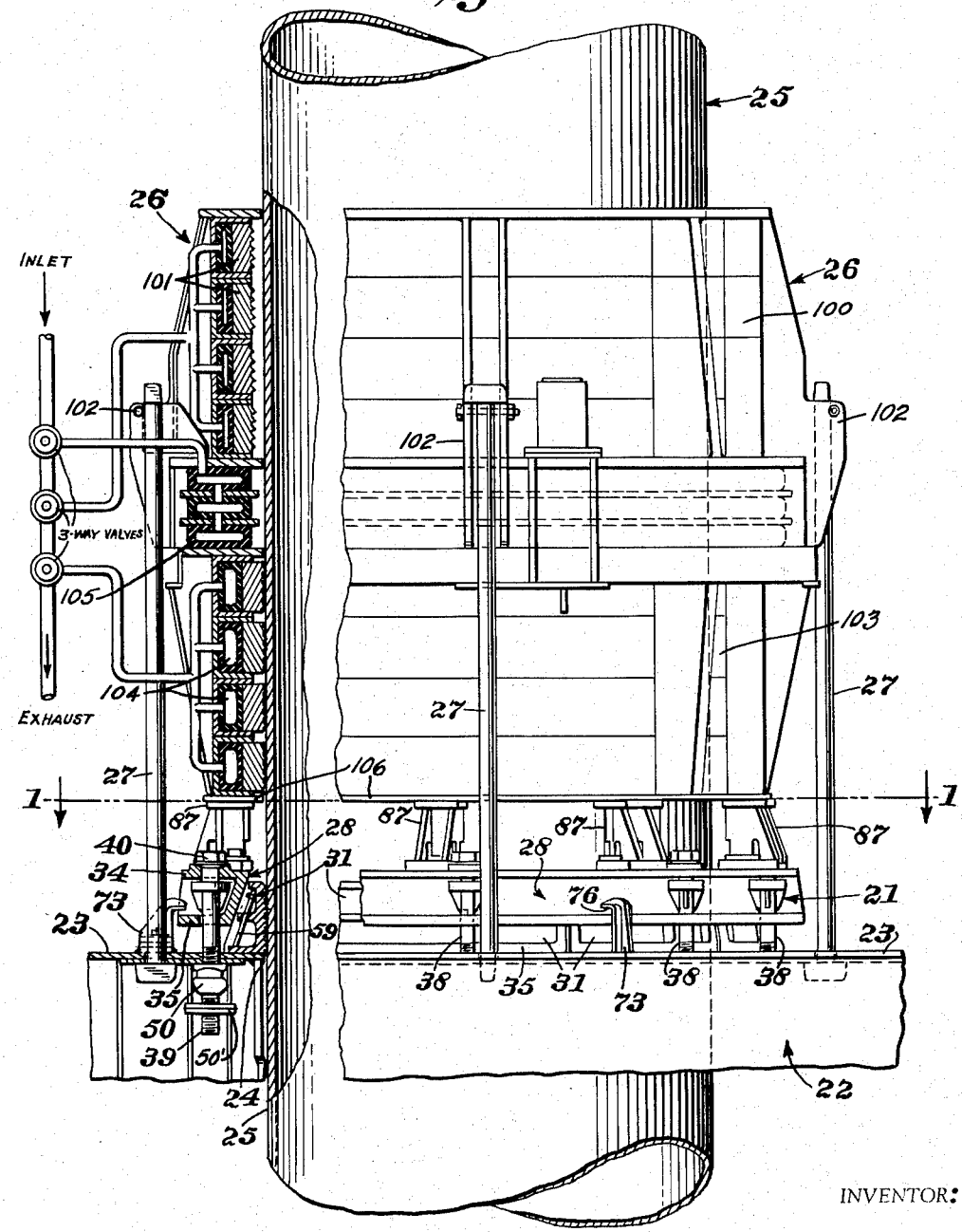

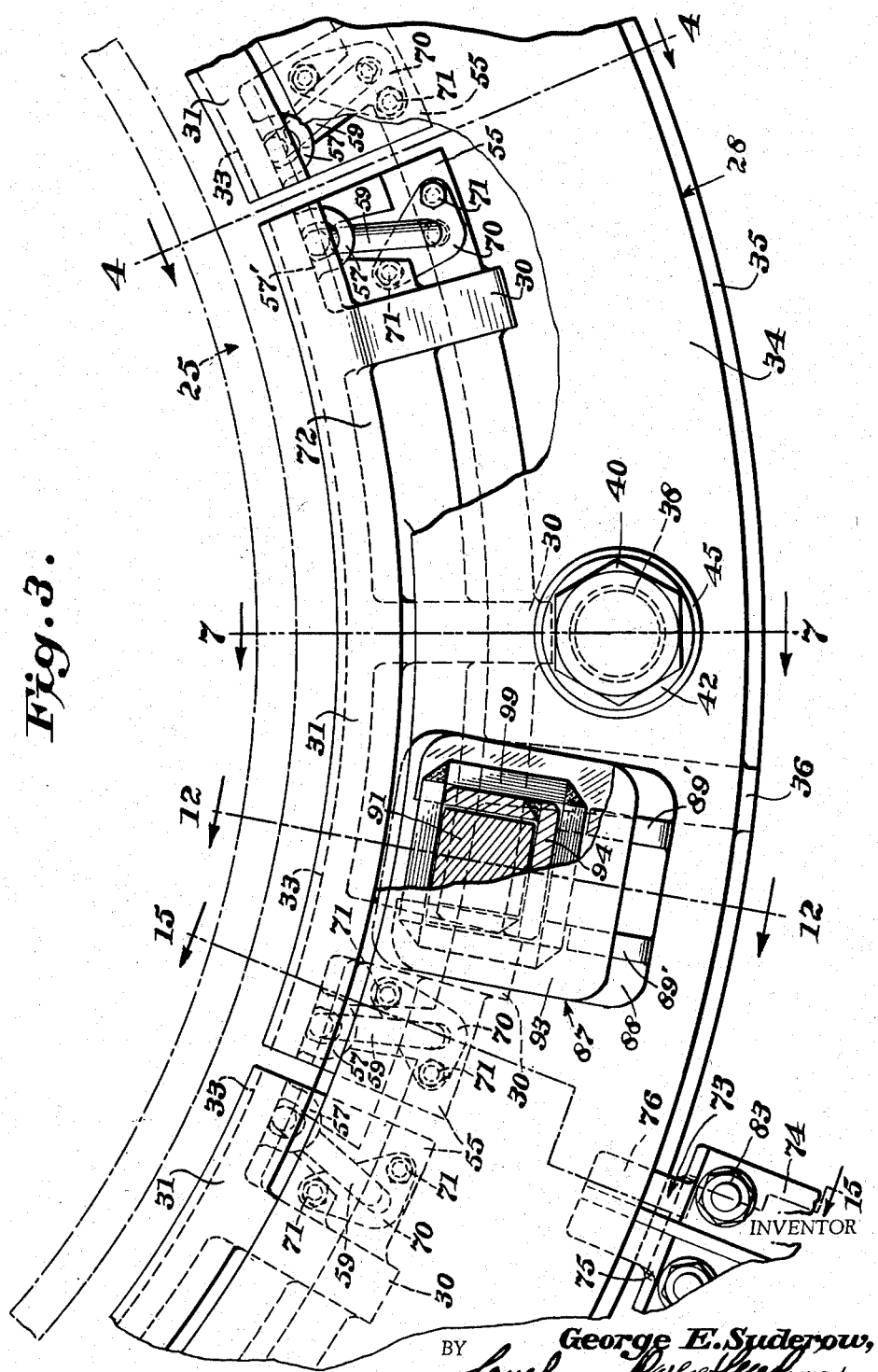

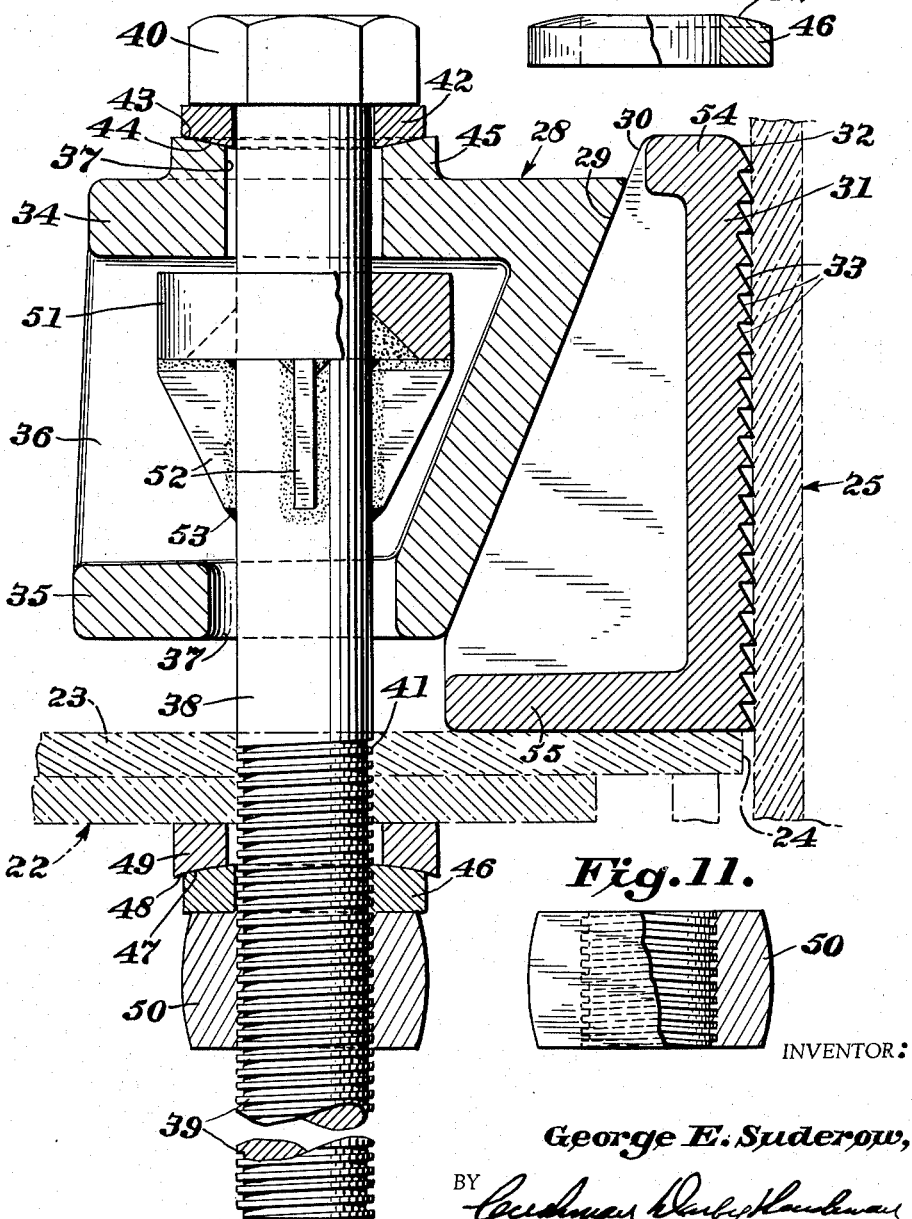

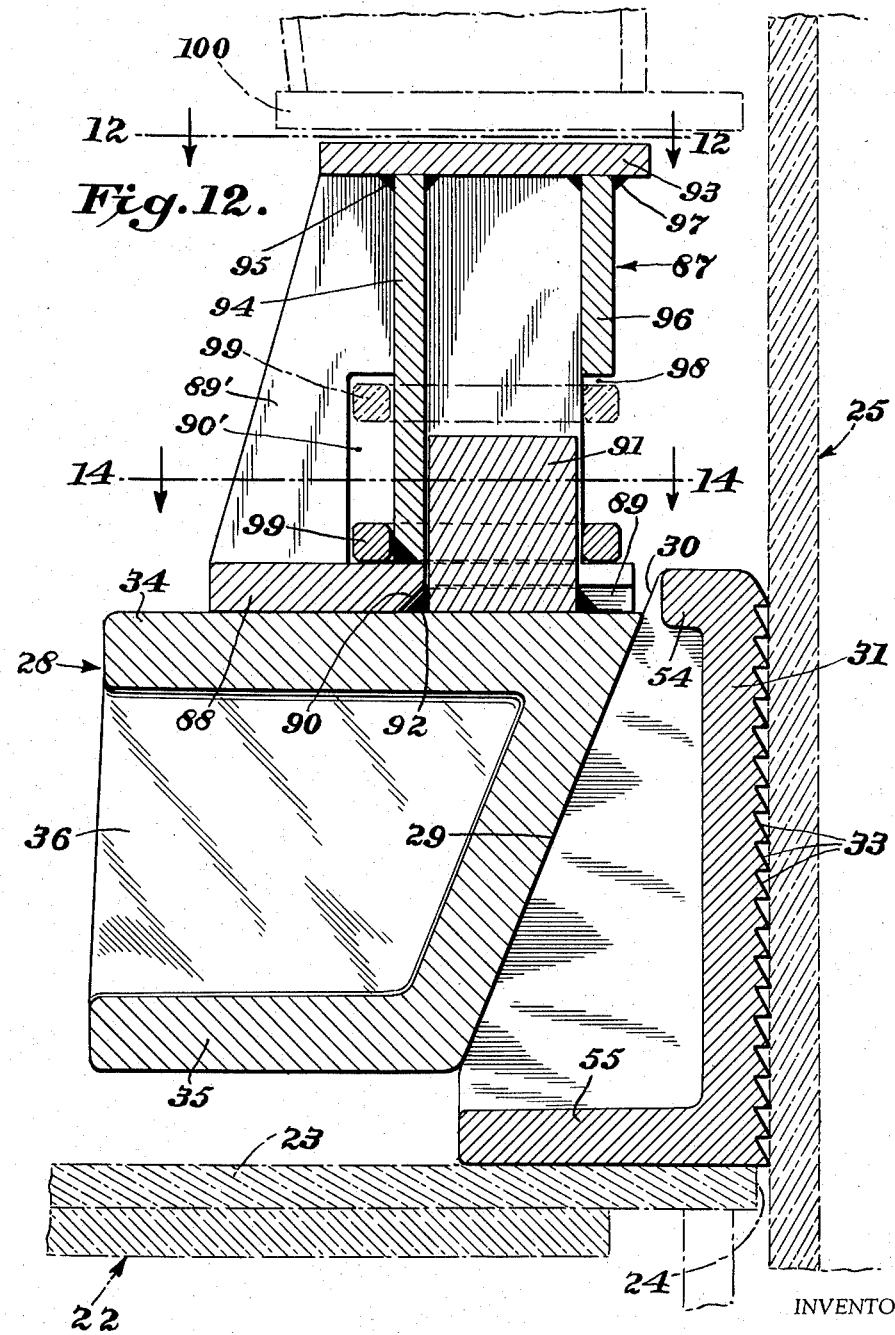

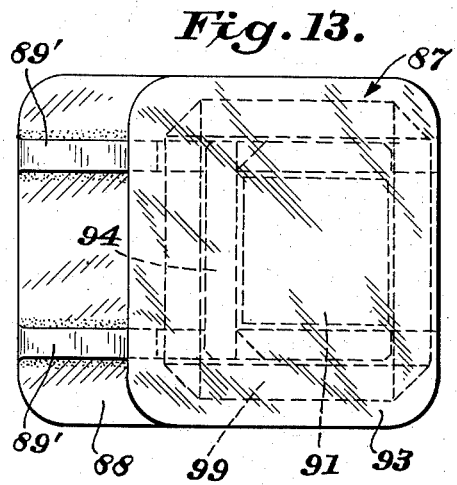
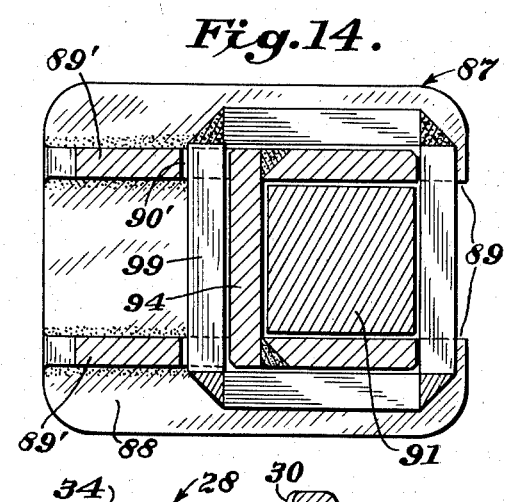
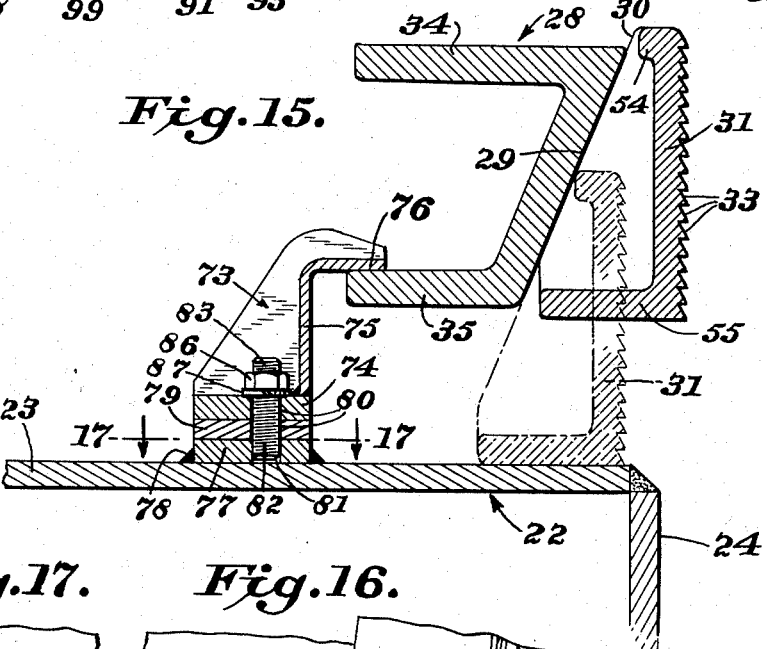
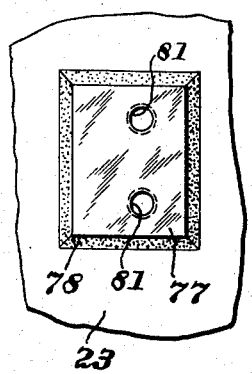
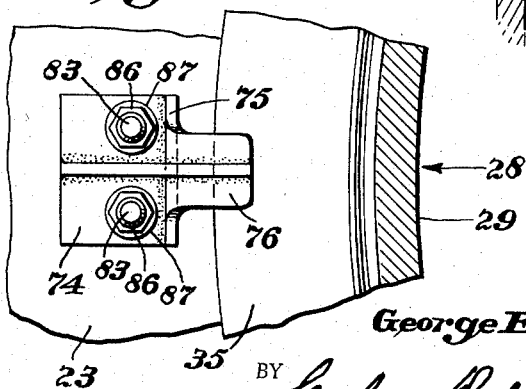

United States Patent Office 2,873,580
Patented Feb. 17, 1959

2,873,580

RELEASABLE GRIPPER AND LOCKING ASSEMBLY FOR LAND AND MARINE SUPPORTING COLUMNS

George E. Suderow, New York, N. Y., assignor to De Long Corporation, a corporation of Delaware Application September 29, 1953, Serial No. 382,948

14 Claims. (Cl. 61—46.5)

The present invention relates to an improved gripper assembly arranged to be associated with land or marine columns, poles, posts, uprights, caissons and the like, for releasably connecting a base or platform to the column.

A primary object consists in associating with a base such as the deck of a barge or the like, a new and improved mechanical gripper and lock assembly comprising an annular member within which are positioned segmental gripper slips or shoes having serrated inner surfaces. The pressure ring on its inner face has an inclined surface which engages complementary inclined outer surfaces on the slips to provide wedging means which upon downward pressure being applied to the annular member causes the inner serrated surfaces of each of the slips to be moved and maintained in firm locking engagement with the wall of a tubular column such as a caisson or the like. Additionally, means are provided for loosely connecting the annular member to each of the segmental or sectional gripper slips.

A further object comprehends the provision of means for adjustably connecting a pressure ring or annular member to the deck of a barge or the like, and providing means for limiting the upper movement of the pressure ring relative to the gripper slips.

A further object consists in associating with a barge for subaqueous drilling operation, a gripper and lock assembly including an outer ring, independent segmental slips or shoes within the ring and arranged to engage a caisson or the like, for the purpose of locking the caisson in a fixed position relative to the barge. Additionally, a jack mechanism is mounted on the barge for raising or lowering the caisson. Interposed between the deck or platform of the barge and the jack assembly are spaced bearing supporting members arranged to be detachably connected to the pressure ring so as to transfer the full load imposed on the jack mechanism to the pressure ring.

Other objects and advantages of the invention will become apparent from the following description when taken in conjunction with the accompanying claims and drawings.

Referring to the drawings in which are shown several embodiments the invention may assume:

Figure 1 is a sectional plan view taken substantially along line 1—1 of Figure 2.

Figure 2 is an elevational view of Figure 1 with parts in section for clearness of illustration.

Figure 3 is an enlarged detailed plan view of Figure 1 with parts in section.

Figure 4 is an enlarged section view taken substantially along the line 4—4 of Figure 1.

Figure 5 is a sectional view taken substantially along the line 5—5 of Figure 4.

Figure 6 is a section view taken substantially along the line 6—6 of Figure 4.

Figure 7 is an enlarged section view taken substantially along the line 7—7 of Figure 1.

Figures 8, 9, and 10 are detailed views with parts in section of washers associated with each of the retaining bolts.

Figure 11 is a detailed side view of the locking nut shown in Figure 7, and with parts in section.

Figure 12 is an enlarged sectional view taken substantially along the line 12—12 of Figure 1.

Figure 13 is a detail plan view of the jack supporting member shown in Figure 12.

Figure 14 is a sectional view taken substantially along the line 14—14 of Figure 12.

Figure 15 is a sectional view taken substantially along the line 15—15 of Figure 1.

Figure 16 is a plan view of Figure 15, and

Figure 17 is a sectional view taken along the line 17—17 of Figure 15.

Referring to the drawings, the improved gripper or locking assembly generally indicated by the numeral 21, is shown associated with a floating barge 22 having its deck 23 provided with one or more vertical openings 24 (Figure 2) through which extends a caisson or other suitable supporting leg or column 25, which may be driven into the ground or withdrawn therefrom by any well known hydraulic or mechanical means such as the jack mechanism 26, detachably connected to the deck 23 by the bolts 27. As shown, this jack mechanism is substantially similar in construction and operation to the hydraulic jack embodied in the Pointer application, Serial No. 283,567, filed April 22, 1952, now Patent No. 2,775,869. It will be manifest that the gripper assembly may be efficiently used with land supports, or platform members and with various types of components to be raised or lowered.

Each gripper and locking assembly includes an outer pressure ring or annular member 28 which is positioned above and concentric with one of the openings 24 in the deck 23. The ring 28 has its inner face provided with circumferentially spaced inclined surfaces 29 (Figure 4), which engage complementary inclined surfaces 30 on the outer faces of the segmental gripper slips or shoes 31 that are positioned within the ring 28, so as to embrace the caisson 25 and be moved in and out of engagement therewith (Figure 7). The inner wall or face 32 of each of the segmental slips 31 is provided with serrations or teeth 33 arranged to frictionally engage with adjacent outer wall of the caisson 25, when the ring 28 is moved downwardly relative to the slips 31. The pressure ring 28 has extended outwardly therefrom, vertically spaced horizontal flanges 34 and 35 (Figure 7), that form a space or pocket 36 therebetween. The flanges 34 and 35 are provided with vertically aligned openings 37 through which extend a retaining bolt 38 having a threaded lower portion 39 and a tool receiving polygonal head 40. The deck 23 is also formed with an opening 41 that aligns with the openings 37 in the flanges 34 and 35. The bolts 38 are circumferentially spaced around the pressure ring 28 (Figure 1) so as to insure the gripper assembly being firmly mounted in a proper position when the parts are assembled. Between the top of the ring 28 and each of the heads 40 of the bolts 38, is a washer 42 which has a convex surface 43 arranged to engage the concave surface 44 on the raised portion 45 of the flange 34 so as to insure proper seating of each of the bolts. The threaded end 39 of the bolt 38 is connected to the underside of the deck 23 preferably by a washer 46 having an upper convex surface 47 which engages the underside of concave surface 48 of a co-acting washer 49. A locking nut 50 is threaded to the bolt 38 to prevent withdrawal of the nut 46. When the assembly is in its inoperative position, the nut 50 is arranged to engage a stop flange 50' rigidly mounted on the barge and apertured to receive the threaded end 39 of the bolt. A retaining ring 51 may be positioned in the pocket 36 to prevent withdrawal of the bolt through the flange 34 when the nut 50 is removed. Radially extending ribs 52 may be welded as at 53 to the bolt 38 below the ring 51, so as to maintain the latter in position when the parts are assembled. It will be seen that the upper pair of curved engaging surfaces 43 and 44 co-act with the lower pair 47 and 48 to allow independent rocking movement of the ring 28 and its associated parts relative to the deck 23 when the parts are assembled.

The outer wall or face of each of the segmental gripper slips between the inclined surfaces 29 is preferably formed with end flanges 54 and 55 and an intermediate flange or lug 56 (Figure 4) which progressively increases in length toward the lower flange 55. Adjacent the flange 54 is a U-shaped bolt 57 which is welded as at 57' to the outer wall 58 of each of the gripper slips 31, so as to provide an eyelet for receiving a detachable inclined rod 59 that extends loosely through an opening 60 in the intermediate flange 56 and through a U-shaped bracket or eyelet 61. The bracket 61 has its arms 62 threaded as at 63 and these arms extend through openings 64 in the ring 28 so as to be secured thereto by the nuts 65 and washers 66 (Figure 6). A spacer bar 67 may be welded to the arms 62 as at 68. The lower end of the detachable rod 59 is arranged to extend into a socket 69 in a plate 70 (Figure 4) that is mounted on the top of the flange 55 and secured thereto by the spaced threaded bolts 71. It will be seen that each slip or shoe 31 has a roughened inner face 33 with its outer face provided with the spaced inclined wedging surfaces 30 for co-acting with the cam surface 29 of the ring. Adjacent the ends of each of the slips 31 there is positioned the inclined bolts 59 for detachably connecting the slips to the ring 28. Between the inclined portions 30 are formed the recesses or spaces 72 (Figure 5). The size and shape of these parts may be varied in accordance with their particular use.

Circumferentially spaced around the pressure ring 28 are stop members 73 (Figure 15) each of which has a horizontal flat base 74 from which extends upwardly an arm 75 that is bent outwardly to form a horizontal flange 76 arranged to overlap and engage the lower flange 35 of the pressure ring 28 for the purpose of limiting the upward movement thereof. The barge has mounted thereon a rectangular wear plate 77 which may be welded at 78 to the deck 23. Between the base 74 and the plate 77 may selectively be interposed a shim or block 79 which vary in height so as to vertically adjust each of the stop members 73 relative to the deck. The base 74 and block 79 are provided with aligned openings 80 of the same diameter (Figure 15). These openings register with the opening 81 in the plate 77 which is of smaller diameter than the openings 80 so as to have fixed therein the lower end 82 of each of the threaded bolts 83. Each of the stop members 73 is maintained in a fixed position on the deck by engagement of the threaded nuts 86 with the base 74. A washer 87 is interposed between each of the nuts 86 and the base 74. The flange 76 is vertically spaced from the deck 23 a sufficient distance to allow the ring 28 to be moved vertically from its dotted line position as shown in Figure 15 to its full line position so as to permit the insertion of the caisson 25 into the opening 24. It will be seen that tightening up of the bolts 38 cause the ring 28 to be moved downwardly into wedging engagement with the slips 31 thus forcing the slips into locking engagement with the wall of the caisson 25. Conversely when the ring 28 is raised, the slips are moved away from the caisson. The adjustment of the stop member 73 may be controlled by varying the thickness of the shim or block 79 so as to raise or lower each of the stops 73 relative to the deck 23.

Arranged to be mounted on the ring 28 are circumferentially spaced supporting plate members generally indicated by the numeral 87 (Figure 1) for the purpose of transferring the load imposed on the jack mechanism 26 to the pressure ring 28 and the barge 22. Each of the supporting plates 87 preferably comprises a rectangular base 88 (Figure 13) having a U-shaped slot 89 extending outwardly towards the slips 31 (Figure 12) and preferably formed with a tapered inner wall 90. A lug or block 91 extends upwardly from the pressure ring 28 and is welded thereto as at 92, and is arranged to loosely fit within the U-shaped opening 89 in the base 88. Each of the supporting members 87 has a reduced top plate member 93 (Figure 12) to which is welded a vertical rear plate 94 as at 95 that extends downwardly to the base 88. A front plate 96 is welded as at 97 to the top plate 93 and terminates short of the top of the lug 91 so as to form an opening or a space 98 for allowing the member 87 and its associated parts to be moved so that the lug 91 fits within the U-shaped opening 89 as shown in Figure 12, or can be removed therefrom when moved horizontally to the left.

Spaced inclined parallel plates or webs 89' are disposed at right angles to the plates 94 and 96 to reinforce the member 87. Each of the webs 89' has a cut-out or recessed portion 90'. In order to releasably lock or mount the member 87 in a fixed position relative to the lug 91, there is provided a vertically movable hollow locking collar or ring 99. The collar 99 fits within the recess 90' and is shown as substantially square in shape and of such size as to fit loosely over both the vertical plate 94 and the lug 91, when the parts are assembled.

As was briefly noted above, the jack mechanism 26 is substantially similar in construction and operation to the hydraulic jack disclosed in the Pointer application Ser. No. 283,567 filed April 22, 1952. The structural details of the particular jack mechanism shown in Figure 2 are disclosed in copending application Ser. No. 495,003 filed March 17, 1955, which application constitutes a division and continuation in part of the present application.

The gripper and locking assembly 21 of the present invention is particularly adapted to be utilized with a jack mechanism of the type employed in a marine construction system, such as disclosed in the aforesaid Pointer application. Briefly, the Pointer system embodies the provision of a floating barge, such as the barge 22 illustrated in Figure 2, having a plurality of guide means in the form of vertical openings, such as the openings 24 illustrated in Figure 2. The barge may be towed or otherwise transported to a suitable marine site where it is desired to erect either a temporary or permanent dock, pier or the like which is supported from the marine bottom. In order to support the barge from the marine bottom, a plurality of caissons or supporting legs, such as the column 25 illustrated in the drawings, are inserted through the openings and their movement is controlled by jack mechanisms, such as the jack mechanism 26.

The jack mechanisms are initially operable to maintain the caissons in an elevated position above the barge and are releasable to permit the caissons to drop down through the openings so that their lower ends will become embedded in the marine bottom. Subsequently, the jack mechanisms are operable to engage the caissons so as to elevate the barge thereon to a suitable height above the water level. Once the barge is elevated to its working height the upper deck surface thereof may be utilized for any desired purpose. Where the barge is to be utilized as a temporary installation, it is desirable, if not necessary, to lock the barge to the caissons by means other than the jack mechanisms, since they require actuation by a constant source of power to grippingly engage the caissons. The gripper and locking assembly 21 of the present invention is particularly advantageous in performing this function. Of additional significance is the fact that this mechanical gripping and locking of the barge to the caissons permits the jack mechanisms to be removed for other operations while the platform barge is temporarily in use, if desired. As disclosed in the Pointer application, the manner in which the barge is secured to the caissons in order to permit removal of the load from the jack mechanisms or the jack mechanisms themselves is rather cumbersome and quite costly in operation. With the present arrangement this securement is effected simply and in a positive manner. Furthermore, the assembly of the present invention is arranged to cooperate with the jack mechanism so that the latter may be utilized to apply mechanical gripping pressure to the assembly. Another advantage of the present assembly in the Pointer marine system is that the same permits easy removal of the jack mechanisms.

In brief, the jack mechanism 26 includes an upper section 100 having a pneumatically-operated releasable holding assembly 101 mounted therein. The upper section includes a plurality of circumferentially spaced lugs 102 arranged to engage the headed upper end of the bolts 27 so as to limit the upward vertical movement thereof. The jack mechanism also includes a lower section 103 having a pneumatically-operated releasable holding assembly 104 mounted therein. The sections 100 and 103 are mounted for relative vertical movement and an annular bellows assembly 105 is mounted between the sections for effecting this relative vertical movement between the sections in a direction away from each other. The lower section 103 is preferably provided with an annular base plate 106 which is arranged to cooperatively engage the gripper and locking assembly 21 of the present invention.

When used with a jack mechanism in the marine construction system of the Pointer application, the gripper and locking assembly 21 of the present invention operates as follows bearing in mind that while this operation is described in connection with but a single caisson, a plurality of such caissons are utilized in the system: Either during the transporting of the floating barge to the marine site of operation or after the same has been transported thereto, the caisson 25 is supported in an elevated position extending above the deck of the barge with both the upper and lower holding assemblies of the jack mechanism actuated into engagement with the caisson. With the caisson supported in this manner, the gripping and locking assembly 21 is disposed in its inoperative or retracted position wherein the lower flange 35 of the pressure ring 28 is engaged with the horizontal flanges 76 of the stop members 73. The gripper slips or shoes 31 are disposed in their lowermost position with respect to the pressure ring so that their serrated faces 32 are disposed out of engagement with the caisson. The pressure ring 28 is supported in this position by the engagement of the locking nuts 50 with the stop flanges 50' and the engagement of the retaining ring 51 with the flange 34. In addition, the supporting plate members 87 are removed from their retained positions on the lugs 91.

In order to support the caisson in an elevated position by the jack mechanism, the latter must in turn be supported by the barge. This support is effected by the engagement of the base plate 106 of the lower section of the jack mechanism with the upper surface of the plugs 91 of the gripper assembly. In this manner, the gripper assembly serves to transmit the weight of the caisson supported by the jack mechanism, as well as the weight of the jack mechanism itself, to the barge. The weight is transmitted through the bolt assemblies in the manner indicated above. With the caisson thus retained by the jack mechanism and supported on the barge through the gripper and locking assembly 21, the holding assemblies 101 and 104 of the jack mechanism are released to permit the caisson to drop through the opening 24 until its lower end is embedded in the marine bottom. Next, the jack mechanism is actuated (in its normal manner) to raise the barge on the embedded caisson. It will be noted that during this movement, the barge is supported on the caisson by virtue of the engagement of the jack mechanism therewith and the connection of the bolts 27 to the upper section of the jack mechanism and the platform. The gripper and locking assembly 21 is disposed below the base plate 106 of the jack mechanism sufficient to permit the lower section to be moved through the full stroke of the bellows assembly 105 without being contacted. Thus, the jack mechanism can be actuated through its full lifting stroke to elevate the barge without interference from the gripping and locking assembly 21.

When the barge has been elevated to its desired working position at a predetermined height above the water level, the gripper and locking assembly 21 is moved from its inoperative retracted position to its operative position, as illustrated in the drawings, in the following manner. The bolt assemblies are turned so as to effect movement of the pressure ring downwardly and hence move the slip segments 31 outwardly until they engage the caisson. Next, the supporting plate members are moved laterally onto the lugs 91 and the rings 99 dropped in position to retain the same. With the supporting plate members disposed in operative position on the lugs 91, their upper surfaces 87 will be disposed in a position to be engaged by the base plate 106 of the jack mechanism during the downward stroke of the pneumatic bellows assembly 105. Thus, with the pneumatic holding assembly 101 of the upper section 100 in engagement with the caisson and the holding assembly 104 of the lower section 103 retracted, the pneumatic bellows 105 may be actuated to move the lower section downwardly until the supporting plate members are engaged. Continued movement of the lower section will force the pressure ring downwardly which in turn firmly engages the slip segments with the caisson. Next, the bolt assemblies are tightened so as to retain the pressure ring in its lowermost position into which it has been moved by the jack mechanism. With the gripper and locking assembly 21 thus engaged, the holding assembly 101 of the upper section of the jack mechanism is released to transfer the load carried thereby to the locking assembly. With the assembly 21 supporting the barge on the caisson, the jack mechanism may be removed entirely if desired.

The assembly 21 is suitable to maintain the barge in an elevated position when the same is to be used temporarily. However, where the installation is of a permanent nature, it is preferable to weld or otherwise effect a permanent securement between the barge and caisson. After this permanent securement has been effected, the assembly 21 may be readily removed by removing the stop members 73, nuts 46 and 50 and then raising the entire assembly over the end of the caisson.

Assuming that the assembly 21 is utilized in a temporary installation and that the jack mechanism has been replaced after having been utilized elsewhere during the temporary operations on the barge, the above procedure may be reversed so as to make the barge suitable for transportation to a new marine site. Thus the jack mechanism is first actuated to transfer the load from the assembly 21 to the jack. The assembly 21 is then moved from its operative position, as shown in Figure 2, to its inoperative position, as described above. The jack mechanism may be utilized to assist in the release of the assembly in the event that the loosening of the bolt assemblies is too difficult by manual tools. With the assembly in its inoperative position, the supporting plate members are removed by lifting the retaining rings 99 and sliding the members out laterally. Next, the platform is lowered on the caisson by the normal operation of the jack mechanism. When the barge is again supported in floating relation on the water, the jack mechanism 26 is then operable to pull the caisson free from its embedded condition in the marine bottom. In this regard, it will be noted that the jack mechanism must again be supported on the barge through the assembly 21. That is, the base 106 of the lower section must engage the upper surface of the lugs 91. The pressure ring 28 is maintained in its raised position by the bolt assemblies in which the rings 51 engage the upper flange 34 and the nuts 50 engage the stop flanges 50'. In this position, the gripper assembly 101 of the upper section is actuated into contact with the caisson when the pneumatic bellows assembly 105 is deflated. Actuation of the bellows assembly will cause the upper section and hence the caisson to be moved upwardly with respect to the barge. This operation is continued until the caisson is raised to its elevated transporting position and the barge is prepared to move to a new site.

It will be understood that the forms of the invention shown are merely illustrative or preferred embodiments and that such changes may be made as come within the scope of the following claims.

I claim:

1. In apparatus of the type described, the combination comprising: a platform; a supporting leg for supporting said platform; guide means mounting said supporting leg on said platform for relative substantially vertical movement in either direction with respect thereto; a jack mechanism for selectively restraining or effecting relative vertical movement in either direction between said platform and said supporting leg, said jack mechanism comprising a pair of holding means mounted for vertical movement with respect to each other and for releasable engagement with said supporting leg, and power-actuated means for effecting relative movement between said pair of holding means; a holding assembly for restraining relative vertical movement between said platform and said supporting leg independent of the restraint of said jack mechanism, said assembly including supporting leg engaging means movable between a retracted position and an extended position in engagement with said supporting leg to restrain vertical movement; and means movable from a position permitting independent operation of said jack mechanism into a position operable to transmit relative vertical movement between said pair of holding means to said supporting leg engaging means so as to move the latter into its extended position in engagement with said supporting leg.

2. In apparatus of the type described, the combination comprising: a platform; a supporting leg for supporting said platform; guide means on said platform mounting said supporting leg for substantially vertical movement in either direction relative to said platform; a pair of holding means carried by said platform for vertical movement relative to each other and for releasable engagement with said supporting leg to restrain vertical movement in either direction; power-actuated means for forcefully effecting relative movement between said pair of holding means; mechanical gripping means carried by said platform for mechanically restraining relative vertical movement between said platform and said supporting leg independently of the restraint of said pair of holding means, said mechanical gripping means being mounted on said platform for movement between a retracted position and an extended position in gripping engagement with said supporting leg to restrain vertical movement; means movable from a position permitting independent operation of said pair of holding means into a position operable to transmit relative vertical movement between said pair of holding means to said mechanical gripping means so as to move the latter into its extended position in gripping engagement with said supporting leg; and locking means for retaining said mechanical gripping means in said extended position independently of said pair of holding means.

3. The combination as defined in claim 2 wherein said mechanical gripping means comprises gripper slips mounted for radial movement between said retracted and extended positions, and a ring member engaging said gripper slips, said ring member and said slips having opposed wedge surfaces engaging each other operable to effect movement of said gripper slips from their retracted position to their extended position upon longitudinal movement of said ring member in one direction.

4. The combination as defined in claim 3 wherein said means movable from a position permitting independent operation of said pair of holding means comprises a series of circumferentially spaced motion-transmitting members removably mounted on said ring member, said motion-transmitting members when mounted on said ring being disposed in a position to be engaged by one of said pair of holding means.

5. The combination as defined in claim 3 wherein said locking means comprises a series of circumferentially spaced bolt assemblies extending between said ring member and said platform.

6. The combination as defined in claim 3 wherein said mechanical gripping means further includes means between said ring member and said gripper slips for moving the latter from said extended position to said retracted position upon longitudinal movement of said ring member in the opposite direction.

7. The combination as defined in claim 6 wherein said last-mentioned means comprises a rod disposed parallel to said wedge surfaces and detachably mounted on each gripper slip, and an eyelet carried by said ring member slidably receiving each of said rods.

8. The combination as defined in claim 7 wherein each of said rods is detachably mounted on its associated gripper slip by means of an eyelet secured to said gripper slip for slidably receiving one end of said rod, and a plate removably mounted on said gripper slip, said plate being apertured to receive the other end of said rod.

9. In apparatus of the type described, the combination comprising: a platform having an upper deck surface and an opening extending from said surface downwardly through said platform; a supporting leg mounted within said opening for substantially vertical movement in either direction with respect to said platform; a jack mechanism disposed above the upper deck surface of said platform and surrounding said supporting leg for selectively effecting and restraining relative vertical movement in either direction between said platform and said supporting leg, said jack mechanism comprising upper and lower jack sections movable vertically with respect to each other, means carried by each section for releasably engaging said supporting leg to restrain vertical movement in either direction, and power-actuated means for effecting relative movement between said sections; stop means between the platform and said upper section permitting movement of both sections downwardly but limiting the upward movement of said upper section; a locking and gripping assembly disposed between said lower section and said upper deck surface and surrounding said supporting leg for mechanically restraining relative vertical movement between said platform and said supporting leg independently of the restraint of said jack mechanism, said assembly comprising a plurality of circumferentially spaced radially movable gripper slips, a pressure ring mounted for vertical movement with respect to said slips, cooperating wedge surfaces on said ring and said slips operable to effect radial movement of said slips between retracted and extended positions in response to vertical movement of said ring, and locking means operatively associated with said ring for retaining said slips in their extended position and for supporting said ring on said platform when said slips are in their retracted position, said ring providing upper surface means for supporting said jack mechanism on said platform through said locking means when said jack mechanism is in its downward position relative to said stop means; and means movable from a position permitting independent operation of said jacking mechanism into a position operable to transmit relative vertical movement between said jack sections to said ring when said jack mechanism is in its limiting position relative to said stop means.

10. The combination as defined in claim 9 wherein said pressure ring includes a radially outwardly extending annular flange; and wherein said platform is provided with stop means for engaging said flange so as to limit the upward movement of said ring.

11. The combination as defined in claim 9 wherein said ring is provided with a plurality of circumferentially spaced lugs, said lugs providing said upper surface means for supporting said jack mechanism.

12. The combination as defined in claim 11 wherein said normally inoperable means comprises support members removably mounted on said lugs.

13. The combination as defined in claim 12 wherein each of said support members includes a vertical wall and an opening extending transversely therefrom for receiving the associated lug upon radially inward movement of the support member with respect to the associated lug and a retaining ring engageable around each lug and the vertical wall of the associated support member for retaining the latter in its operative position.

14. In apparatus of the type described, the combination comprising: a platform having a vertical guiding opening extending therethrough for receiving a supporting leg; means on said platform providing a horizontal surface surrounding said opening; a mechanical locking and gripping assembly mounted on said horizontal surface for securing said platform to the leg in supported relation thereto, said assembly comprising a plurality of circumferentially arranged gripper slips having lower horizontal surfaces engaging said first-mentioned horizontal surface and movable radially in engagement therewith, a ring member mounted above said first-mentioned horizontal surface in engagement with said gripper slips, said ring member and said gripper slips having interengaging inclined surfaces operable upon downward movement of said ring member to effect radially inward movement of said gripper slips into engagement with the leg and upon upward movement of said ring member to effect radially outward movement of said gripper slips out of engagement with the leg; and means connecting said platform and said ring member for positively moving the latter selectively in either vertical direction relative to the former and securing said ring member to said platform in its lowermost position with said gripper slips in engagement with the leg so as to transmit the support afforded by the engagement of said assembly with the leg to said platform or its uppermost position with said gripper slips out of engagement with the leg so as to effect support of said assembly from said platform.

References Cited in the file of this patent

UNITED STATES PATENTS

| | | |
|---|---|---|
| 1,111,535 | Greve | Sept. 22, 1914 |
| 1,676,275 | Montgomery | July 10, 1928 |
| 2,042,353 | Morehouse | May 26, 1936 |
| 2,237,387 | Crites et al. | Apr. 8, 1941 |
| 2,352,370 | Carruthers | June 27, 1944 |
| 2,534,527 | Myers | Dec. 19, 1950 |
| 2,589,146 | Samuelson | Mar. 11, 1952 |
| 2,592,448 | McMenimen | Apr. 8, 1952 |
| 2,660,440 | Kurtz | Nov. 24, 1953 |